Figure 1:
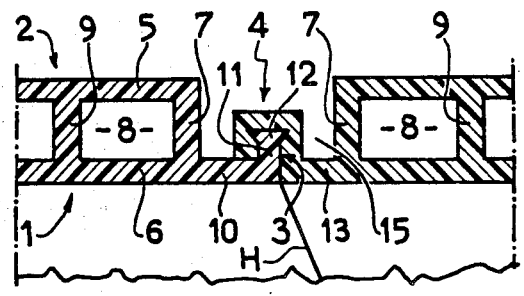

United States Patent [19]

Langenfeld et al.

[11] 4,301,200
[45] Nov. 17, 1981

[54] PLASTIC TUBE FORMED BY SPIRAL WINDING OF A SNAP LOCKING PROFILE STRIP

[75] Inventors: Michel Langenfeld, Lay Saint Christophe; Andre Lagabe, Foug, both of France

[73] Assignee: Pont-a-Mousson S.A., Nancy, France

[21] Appl. No.: 184,443

[22] Filed: Sep. 5, 1980

[30] Foreign Application Priority Data

Sep. 10, 1979 [FR] France ................................. 79 22550

[51] Int. Cl.³ ............................................. F16L 9/16
[52] U.S. Cl. ................................. 428/33; 24/201 C; 138/154; 428/188
[58] Field of Search ................ 428/33, 178, 188, 192; 138/154; 24/201 C

[56] References Cited

U.S. PATENT DOCUMENTS

| 3,495,628 | 2/1970 | Boender | 138/154 X |
| 3,679,531 | 7/1972 | Wienand et al. | 428/188 X |

Primary Examiner—Henry F. Epstein
Attorney, Agent, or Firm—Sughrue, Mion, Zinn, Macpeak and Seas

[57] ABSTRACT

A profile strip 1 is composed of a rectangular cross-sectional body 2 having on each edge a recessed fastening means 3, 4, one male and the other female. Each fastening means 3–4 comprises an axial support flange 10, 13 which lengthens one of the exterior and interior surfaces 5, 6 of the body 2. The two adjacent flanges are abutting, and the two fastening means when engaged define, with the adjacent sides 7 of the body, a U-sectioned space which is filled by a border insert 16 having a complementary cross-section. The invention enables large diameter tubes of plastic material to be formed without any internal or external projections.

6 Claims, 3 Drawing Figures

PLASTIC TUBE FORMED BY SPIRAL WINDING OF A SNAP LOCKING PROFILE STRIP

This invention relates to plastic tubes formed by spirally winding a profile strip composed of a rectangular cross-sectional body having recessed fastening means on each edge, one male and the other female. These rigid and light tubes can have a diameter considerably greater than the maximum diameters which can be extruded directly in the form of tubes.

The object of the invention is to provide a tube of this type whose interior and exterior surfaces are both smooth, which can easily be manufactured by continuous winding, and whose whorls are firmly joined to one another.

In the tube according to this invention each fastening means comprises an axial support flange which lengthens one of the exterior and interior surfaces of the body of the profile. Two adjacent flanges are abutted and the two fastening means when engaged define with the adjacent edges of the body of the profile a U-sectioned space which is filled by a border insert having a complementary cross-section.

The invention is especially useful where the profile and the border insert are formed of a thermoplastic material, the fastening means being welded one to the other and the border insert being welded to said fastening means and to the adjacent edges of the body of the profile. A cellular structure given to the body of the profile enables the rigidity of the tube to be increased.

Figure 2:
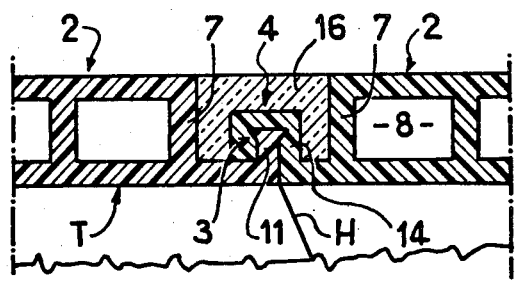
Figure 3:
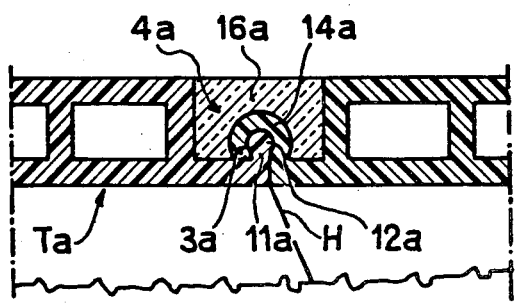

In the drawings:

FIG. 1 is partial cross-sectional view of a tube according to the invention during manufacture, FIG. 2 is a similar view of the finished tube, and FIG. 3 is a similar view of an alternative embodiment of the tube of FIG. 2.

FIG. 1 illustrates the spiral winding H of a profile 1 extruded from a thermoplastic material, for example rigid polyvinyl chloride or PVC. The profile 1 is composed of a body 2 edged on each side with a recessed fastening means 3, 4.

The body 2 has a rectangular cross-section with large axial exterior and interior sides 5, 6 and with small radial sides 7. This body 2 is cellular or coffered, i.e., it contains several longitudinal cavities 8 separated by radial section walls 9. The body 2 can for example contain four rectangular cross-sectional cavities 8, the walls 9 and the sides of the body having a common thickness.

Fastening means 3 is a male relief. It contains an L section comprised of an axial flange 10 and a radial arm 11. The flange lengthens the large interior side 6 of the body 2 and has the same thickness, whereas the arm extends radially towards the exterior over approximately half the height of the small side 7 to finish in a dovetail 12.

Fastening means 4 is a female relief and is composed, in cross-section, of a flange 13 for connection with the body 2, which is analogous to the flange 10, disposed in an extension of this flange and in abutment therewith in the fastened position shown. From the end of flange 13 a U-shaped hook 14 extends towards the outside and turns its dovetail cavity radially towards the inside. It is adapted to exactly surround and snap fit over arm 11 of the fastening means 3 to the point of contacting the flange 10.

In the fastened position, the height of the assembly of the two fastening means is considerably less than that of the body 2, and its width is considerably less than the axial distance separating the small opposite sides 7. Thus, an open-U-shaped space 15 is defined between said sides and around the hook 14.

To finish the tube T (FIG. 2), a border insert 16 of a rigid thermoplastic material, such as PVC, having a complementary U-shaped cross-section, is fitted into space 15. This insert covers the assembly of the two fastening means 3, 4, and its exterior surface is flush with the two adjacent parts of the body 2 of the profile.

The resulting tube T is thus smooth both externally and internally, and therefore unlikely to be subject to catching or tearing during handling. Additionally, the exterior surface of the tube remains constantly clean since it is smooth, in particular when the tube is laid on an earth and/or gravel floor, and the tube is suitable for assemblies by means of known joints and waterproofing fittings. The esthetic advantage is also significant.

Further, there is no risk of the whorls separating one from the other due, on the one hand, to the positive fastening means 3, 4 and, on the other hand, to the locking of said fastening means provided by the border insert 16.

The winding of the profile 1 as well as the installation of the border insert 16 is preferably carried out at a temperature sufficient to provide, in addition to mechanical bonding, waterproof bonding by heat welding of elements 3, 4 and 16. As an alternative, a glue could be used for the same purpose.

The spiral winding of profile 1 with contiguous whorls can be carried out on a mandrel using presser rollers applied on fastening means 3 and 4 and on the border insert 16, which is also wound.

The tube Ta of FIG. 3 differs from that of FIG. 2 only in the shape of fastening means 3a and 4a. The radial arm 11a of the male relief terminates in a three-quarter circular roll 12a, and the hook 14a of the female relief is rounded in a conjugated manner. The concavity of the border insert 16a is complementary.

What is claimed is:

1. A tube of plastic material formed by spirally winding a profile strip comprising a rectangular cross-sectional body (2) having a recessed fastening means on each edge, one male and the other female, wherein each fastening means (3, 4) comprises an axial support flange (10, 13) which lengthens one of the exterior (5) and interior (6) surfaces of the body, said axial support flanges (10, 13) both extending from the same surface of said body, two adjacent flanges abutting one another and two fastening means when engaged defining with adjacent sides (7) of the body a U-sectioned space, and a border insert (16) having a complementary cross-section filling said space and operating to lock said fastening means together.

2. The tube of claim 1, wherein the border insert is also made of a plastic material.

3. The tube of claim 2, wherein the profile strip and the border insert are made of a thermoplastic material, the fastening means being welded one to the other, and the border insert being welded to said fastening means and to the adjacent sides of the body.

4. The tube of any one of claims 1 to 3, wherein both said axial flanges lengthen the interior surface (6) of the body.

5. The tube of any one of claims 1 to 3, wherein the fastening means have mating dovetailed profiles.

6. The tube of any one of claims 1 to 3, wherein the fastening means have mating three-quarter circular profiles.

* * * * *